United States Patent [19]

Nakajima et al.

[11] 4,368,239

[45] Jan. 11, 1983

[54] MAGNETIC RECORDING MEDIUM

[75] Inventors: Kaoru Nakajima; Kunio Kobayashi; Yoshiaki Hisagen, all of Tagajyo, Japan

[73] Assignee: Sony Corporation, Tokyo, Japan

[21] Appl. No.: 174,870

[22] Filed: Aug. 4, 1980

[30] Foreign Application Priority Data

Aug. 6, 1979 [JP] Japan .................. 54-100143

[51] Int. Cl.$^3$ .............................. G11B 5/72
[52] U.S. Cl. ........................ 428/421; 427/44; 427/128; 427/131; 428/447; 428/520; 428/522; 428/523; 428/695; 428/409; 428/900; 360/134
[58] Field of Search ........... 428/900, 695, 409, 694, 428/421, 522, 523, 520, 516, 500, 447, 484; 427/44, 48, 128, 130, 131, 36, 35; 204/159.17; 360/134, 135, 136

[56] References Cited

U.S. PATENT DOCUMENTS

| | | | |
|---|---|---|---|
| 3,993,824 | 11/1976 | Shirahata et al. | 427/131 |
| 4,007,313 | 2/1977 | Higuchi et al. | 428/447 |
| 4,058,443 | 11/1977 | Murata et al. | 204/159.17 |
| 4,091,123 | 5/1978 | Ayusawa et al. | 427/44 |
| 4,110,503 | 8/1978 | Ogawa et al. | 428/64 |
| 4,135,016 | 1/1979 | Ogawa et al. | 428/64 |
| 4,163,809 | 8/1979 | McGinniss et al. | 427/44 |
| 4,169,904 | 10/1979 | Czornyj et al. | 427/44 |
| 4,171,406 | 10/1979 | Yamaguchi et al. | 428/447 |
| 4,180,598 | 12/1979 | Emmons | 427/44 |
| 4,189,514 | 2/1980 | Johnson | 428/900 |
| 4,260,466 | 4/1981 | Shirahata et al. | 427/54.1 |

FOREIGN PATENT DOCUMENTS

| | | | |
|---|---|---|---|
| 52-16202 | 2/1977 | Japan | 427/130 |
| 54-123922 | 9/1979 | Japan | 427/130 |
| 54-214709 | 9/1979 | Japan . | |
| 54-31681 | 10/1979 | Japan | 427/128 |

*Primary Examiner*—Stanley S. Silverman
*Attorney, Agent, or Firm*—Hill, Van Santen, Steadman, Chiara & Simpson

[57] ABSTRACT

A magnetic recording medium having low friction coefficient and superior in aging characteristics is disclosed. The magnetic recording medium is provided with a lubricant which is strongly bonded to the magnetic recording medium by a bombardment of an electron beam. In one embodiment, the lubricant containing a molecular chain having a lubricating property, and a double bond sensitive to dissociation products such as free radicals are coated on a magnetic layer and then electron beam irradiates the magnetic layer. A radical reaction then occurs causing a covalent bond of the lubricant to the magnetic recording layer.

17 Claims, No Drawings

MAGNETIC RECORDING MEDIUM

BACKGROUND OF THE INVENTION

1. Field of the Invention

The present invention generally relates to a magnetic recording medium having a magnetic layer formed on a non-magnetizable support, and especially to a friction reducing agent for the magnetic recording medium.

2. Description of the Prior Art

In any magnetic recording and reproducing system, a magnetic recording medium having a magnetic layer formed on a non-magnetizable support runs in contact with guide members for the medium and with magnetic heads at a substantial velocity. As a result the magnetic recording medium must be wear resistant and have a small coefficient of friction. To reduce the coefficient of friction, the magnetic layer contains some kinds of lubricants or is coated with a layer of lubricants on a surface thereof. However, in the prior art magnetic recording medium, the coating layer of the lubricant on the magnetic layer is apt to come off easily which causes a change of the friction coefficient as the medium is used, then it is necessary to provide a substantial amount of lubricant on the magnetic layer. When the large amount of lubricant is provided on the magnetic recording medium, the lubricant diffuses into the magnetic layer which softenes and reduces the strength of the magnetic layer. When the lubricant is provided in the magnetic recording layer, that is, the mixture of magnetic powder, binder, the lubricant and so on is coated to produce a magnetic layer, the friction coefficient is not stable either and the lubricant exudes from the magnetic layer and causes a so-called blooming. When the blooming occurs, the coming off amount of powder becomes large, which causes a clogging of magnetic heads.

OBJECT AND SUMMARY OF THE INVENTION

Accordingly, it is an object of the present invention to provide an improved magnetic recording medium.

It is another object of the present invention to provide a magnetic recording medium having an improved wear resistance property.

It is a further object of the present invention to provide a magnetic recording medium having a low friction coefficient.

It is a still further object of the present invention to provide a magnetic recording medium carrying a lubricant strongly bonded to the magnetic recording medium which is stable in aging characteristics.

According to one aspect of the present invention, there is provided a magnetic recording medium which has a magnetic recording layer composed of finely divided magnetizable pigment and a binder formed on a major surface of non-magnetizable substrate, and a surface of said substrate opposite to said major surface or a back coating layer composed of a non-magnetizable pigment and a binder formed on said surface of said substrate opposite to said major surface, said magnetic recording medium carrying molecular chains having a lubricating property strongly bonded to said magnetic recording medium by irradiating a radiation to said magnetic recording medium.

DESCRIPTION OF THE PREFERRED EMBODIMENTS

The present invention will be hereinafter described in detail.

A magnetic recording medium comprises a non-magnetizable support and a magnetic layer mainly composed of finely divided ferromagnetic pigment and binder formed on a major surface of the support. On another surface of the non-magnetic support, a non-magnetic pigment coating layer may be formed. The non-magnetic pigment coating layer mainly composed of non-magnetic pigment and binder is provided to control electric resistance, friction coefficient and so on.

According to the present invention, a lubricant which contains a molecular chain which works to reduce the friction coefficient of the medium is provided to the magnetic recording medium. The lubricant may be provided to the magnetic recording medium by adding the lubricant to the magnetic layer or non-magnetic pigment layer (back coating layer), or coating the lubricant on the magnetic layer, on the back coating layer or on the surface of the non-magnetic support when the back coating layer is not provided.

In the present invention, the lubricant is strongly bonded to the magnetic recording medium by bombardment of radiation, such as an electron beam. The lubricant, or the binder provided together with the lubricant contains a chemical double bond which is reactive with dissociation products such as active free radicals formed by the bombardment of the radiation from the lubricant itself or the binder. The free radicals formed by the radiation bombardment react with each other, and they also attack the double bond and radically react with the double bond to make covalent bonds, thus the lubricant is strongly bonded to the magnetic recording medium.

The lubricant can be provided to the medium by various ways. In one method, the lubricant can be provided by coating the lubricant on one of the following: the magnetic layer, the non-magnetic pigment coating layer previously formed or the surface of non-magnetic support. In this case the lubricant containing the double bond reactive with the dissociation products and a solvent is coated on the surface of the medium that is, on one of the surfaces of the support or the layers. The lubricant may be provided on the surface of the medium, with a suitable binder and solvent thereof. In this case either the lubricant or the binder must contain a double bond reactive with the dissociation products formed by bombardment of the radiation, such as free radicals. After the lubricant containing layer is formed on the surface of the medium, the lubricant containing layer is irradiated by an electron beam, and the above reaction occures to strongly bond the lubricant to the medium.

In another method, the lubricant containing a chemical double bond reactive with dissociation products such as free radicals formed by the radiation bombardment can be provided by mixing the lubricant with a binder and magnetic pigment to form a magnetic paint. Similarly the lubricant may be mixed with a binder and a non-magnetic pigment to form a non-magnetic pigment paint. In either case, the paints are then applied to the non-magnetic support. After the magnetic layer containing the lubricant or non-magnetic pigment coating layer containing the lubricant are formed, the layers are irradiated by an electron beam, and then the aforementioned reaction occures.

Thus the molecular chains which have a friction reducing function in the lubricant are strongly bonded to the magnetic recording.

The lubricant which is strongly bonded lubricant to the magnetic recording medium does not easily come off giving an improved durability, and a low friction coefficient which is stable in aging characteristics to the magnetic recording medium.

The lubricant used in the present invention contains a molecular chain which contributes to reduce the friction coefficient of the medium. The desirable examples of such molecular chains are straight chain or branched hydrocarbon groups containing 7 to 23 carbon atoms in the group or straight chain or branched fluorocarbon groups containing 3 to 15 carbon atoms in the group. Such molecular chains can be provided in the form of compounds, such as higher alcohols (ROH), higher fatty acids (R'COOH), esters of alcohols and higher fatty acids or higher alcohols and fatty acids, olefin modified silicone oil (for example KF-412-416 made by Shin-Etsu Chemical Co, Ltd) or, organo silicon compounds such as $(RCOO)_nSi(CH_3)_{4-n}$, $(RCOO)_nSi(CH_3)_{3-n}$,
$$\underset{CH_2CH_2CF_3}{|}$$

wherein N is an integer from 1 to 3.

Further, such compounds that contain double bond in the forms of

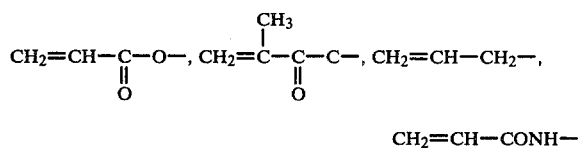

$CH_2=CH-CONH-$ can be used. Examples of such lubricants are represented by the formulae,

which can be obtained by the reaction of acrylic acid or methacrylic acid and higher fatty acid, $CH_2=CH-CH_2COOR$, which is an ester of allyl alcohol and higher fatty acid, $CH_2=CHCONH\ CH_2O-COR$, which is an ester of N-methylylolacrylamide and higher fatty acid,

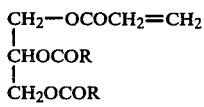

and so on. In the above formulae R represents straight chain or branched hydrocarbon groups. When the lubricant contains fluorine atoms in the molecular chains which exhibit lubricating property, general formulae are $CH_2=CHCOOR_f$,

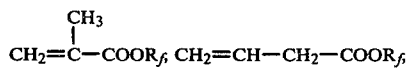

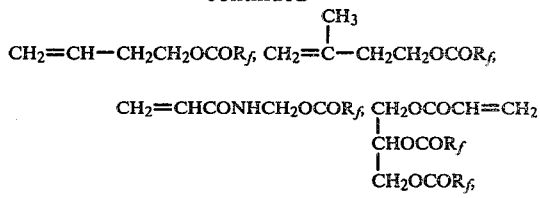

and so on wherein $R_f$ is a fluorine containing group represented by $C_nF_{2n+1}-$, $C_nF_{2n+1}(CH_2)_m-$ (where m is an integer from 1 to 5), $$C_nF_{2n+1}SO_2\overset{R}{\underset{|}{N}}CH_2CH_2-,\ C_nF_{2n+1}CH_2CH_2NHCH_2CH_2-,$$

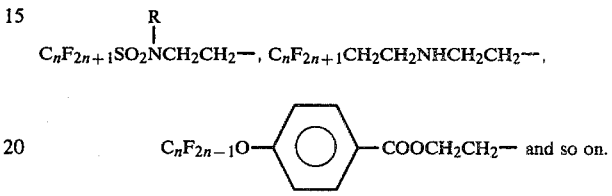

In the above example of the lubricants, when the number of carbon atoms in the hydrocarbon group is less than 7, the hydrocarbon group does not contribute to reduce the friction coefficient, while when the number exceeds 23, a melting point of the lubricant becomes high and the solubility of the lubricant in a solvent is lowered. When, the number of carbon atoms in the fluorocarbon group is less than 3, the molecular chain does not contribute to reduce the friction coefficient, while when it exceed 15, a melting point of the lubricant becomes high, and a the solubility is lowered, neither are desirable.

In the present invention, the lubricant contains a double bond reactive with dissociation products formed by radiation, and as explained the above, the double bond may be an unsaturated bond in the hydrocarbon group. Further it is desirable that the double bond is provided by an acrylic group when considering the reactivity. However, when the lubricant is coated on the surface of the magnetic recording medium together with a binder containing a double bond reactive with the dissociation products formed by the radiation, the lubricant does not necessarily contain a double bond.

The resinous material usable as a binder in the present invention will be described. The binder is used in the magnetic layer, in the non-magnetic pigment layer, or to form a top coating layer together with the lubricant. As examples of suitable material which does not contain the double bond reactive with the dissociation products formed by irradiation, we can mention vinyl chloride-vinyl acetate copolymers, vinyl chloride-vinyl acetate-vinyl alcohol copolymers, vinyl chloride-vinyl acetate-maleic acid copolymers, vinyl-chloride-vinylidene chloride copolymers, vinyl chloride-acrylonitrile copolymers, acrylic acid ester-acrylonitrile copolymers, acrylic acid ester-vinylidene chloride copolymers, methacrylic acid esters-vinylidene chloride copolymers, methacrylic acid ester-styrene copolymers, thermoplastic polyurethane resins, phenoxy resins, polyvinyl fluoride resins, vinylidene chloride-acrylonitrile copolymers, butadiene-acrylonitrile copolymers, acrylonitrile-butadiene-acrylic acid copolymers, acrylonitrile-butadiene-methacrylic acid copolymers, polyvinyl butyrals, polyvinyl acetal, cellulose derivatives, styrene-butadiene copolymers, polyester resin, phenolic resins, epoxy resins, thermosetting polyurethane resins, urea resins, melamine resins, alkyd resins, urea formaldehyde resins and mixtures of these materials.

The binder materials containing a double bond reactive with the dissociation products formed by the electron bombardment are monomers, oligomers, polimers containing acrylic groups. They can be obtained by modifying polyol, polyester, polyurethane, and the like, having various molecular weights with a compound having an acrylic group. Examples of such monomers are acrylic acid, methacrylic acid acrylamide, methacrylamide, hydroxyethylacrylate, and so on. Examples of the acryl compounds usable for the modification are acrylic acid, methacrylic acid, acrylamide, methacrylamide, hydroxyethylacrylate, hydroxyethylmethacrylate and so on. The above mentioned polyol, polyester, and polyurethane may be obtained by reacting polyols, such as (poly)ethyleneglycol, propyleneglycol, trimethylolethane, trimethylolopropane, pentaerythritol, poly carboxylic acids, such as adipic acid, telephtalic acid, and polyisocyanate compounds such as tolylenediisocyanate, hexamthylenediisocyanate and so on.

Suitable ferromagnetic material powders or particles which can be used in the present invention include any ferromagnetic material which finds use in a magnetic recording medium. For example, we can use gamma $Fe_2O_3$, $Fe_3O_4$, a spinel structure constituting an intermediate phase between gamma $Fe_2O_3$ and $Fe_3O_4$, cobalt doped gamma $Fe_2O_3$, cobalt doped $Fe_3O_4$, a cobalt doped spinel structure as aforementioned, chromium dioxide, barium ferrite, various alloys or particles, such as Fe-Co, Co-Ni, Fe-Co-Ni, Fe-Co-B, Fe-Co-Cr-B, Mn-Bi, Mn-Al, Fe-Co-V, and the like, iron nitride or mixtures thereof.

Suitable non-magnetic pigment contained in the non-magnetic pigment layer (back coating layer) are carbon powder (for example channel black, furnance black, graphite and so on), powder of ZnO, $TiO_2$, $SiO_2$, $Al_2O_3$, FeOOH and so on.

The non-magnetic base for the magnetic recording medium of the present invention can also be any of an extremely wide variety of materials. For example materials containing polyester groups such as polyethyleneterephthalate and the like, polyolefin groups such as polypropylene and the like, cellulose derivatives such as cellulose triacetate, cellulose diacetate and the like, polycarbonates, polyvinyl chlorides, polyimides, metallic materials such as aluminum, copper and the like, as well as paper and the like can be used.

Upon preparing the magnetic paint of the present invention, various materials can be used as an organic solvent. One can use compounds having a ketone group such as acetone, methylethylketone, methylisobutylketone, cyclohexanone and the like. There may be an alcohol group present such as in methanol, ethanol, propanol, butanol and the like. The solvent may include an ester group such as in methyl acetate, ethyl acetate, butyl acetate, ethyl lactate, ethylene glycol acetate monoethylether and the like. It may contain a glycol ether group such as ethylene glycoldimethylether, etylene glycol-monoethylether, dioxane and the like. The solvent may be an aromatic hydrocarbon such as benzene, toluene, xylene, and the like. It may be an aliphatic hydrocarbon such as hexane, heptane and the like. Substituted hydrocarbons such as nitropropane and the like can be used. For the purposes of this invention, these solvents can be used individually or in combination.

The magnetic layer of the recording medium may include an abrasive agent such as aluminum oxide, chromic oxide, silicon oxide or the like which materials can be used separately or in combination.

In keeping with modern practice, carbon black may be used as an anti-static agent and lecithin can be used as a dispersing agent.

To irradiate the magnetic recording medium ionizing radiations such as the electron beam, neutron beam, and $\gamma$-rays, are used preferably at a dose of 1 to 10 Mrad and more preferably at a dose of 2 to 7 Mrad with a radiation energy preferably set to 100 keV or more. The above radiation dose is enough to start a desirable radical reaction.

When the lubricant is provided by coating it on surfaces of the recording medium, the lubricant is coated together with a suitable solvent such as freon (fluorocarbon compound marketed by E. I. du Pont de Nemours and Co.) or ethyl acetate which do not affect the magnetic layer. The desirable coating amount of the lubricant is from 30 to 1500 mg/m$^2$. When the lubricant is coated together with the binder, desirable coating of the lubricant and the binder are from 30 to 1500 mg/m$^2$ respectively. When the lubricant is added to the magnetic paint, suitable adding amount is from 0.1 to 5 parts by weight for 100 parts by weight of magnetic powder. When the lubricant is added to the non-magnetic pigment paint, suitable adding amount is from 0.4 to 20 parts by weight for 100 parts by weight of binder.

Now, the present invention will be described with specific examples.

A magnetic paint was prepared as follows;

Acicular magnetic pigment of gamma $Fe_2O_3$: 400 weight parts

Vinyl chloride vinylacetate vinylalcohol copolymer ("Vinylite VAGH", Trade name of Union Carbide Corp.): 50 weight parts Thermoplastic polyurethane resin ("Estane 5702" Trade name, made by B. F. Goodrich Co.): 50 weight parts Lecithin (dispersion agent): 1 weight parts $Cr_2O_3$: 3 weight parts Methyl ethyl ketone (solvent): 600 weight parts Methyl isobutyl ketone (solvent): 600 weight parts The above material were charged into a ball mill and then mixed therein for 20 hours, and 15 weight parts of Desmodur L (isocyanate compound made by Bayer A. G.) was added to the mixture to produce a magnetic paint. The magnetic paint was coated on a base film made of polyethylene terephthalate having a thickness of 16 $\mu$m to produce magnetic layer having a dry thickness of 4 $\mu$m. The magnetic layer was dryed and subjected to a calender process.

EXAMPLE 1

The magnetic layer thus produced was then coated with Freon (Tradename of fluorocarbon compound marketed by E. I. du Pont de Nemours and Co.) solution containing 5 weight % of an organosilicon compound expressed by the formula $(C_{17}H_{33}COO)_2$

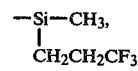

at an amount of 250 mg/m$_2$. Then the electron beam having an energy of 200 KeV (kilo electron volt) was irradiated to the coating layer on the magnetic layer at the dose amount of 2 Mrad.

EXAMPLE 2

An organosilicon expressed by the formula

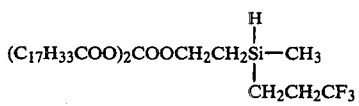

was used instead of the organosilicon compound of Example 1.

EXAMPLE 3

An organosilicon compound expressed by the formula $(C_{17}H_{33}COO)_2Si(CH_3)_2$ was used instead of the organosilicon compound of Example 1.

EXAMPLE 4

Stearylmethacrylate was used instead of the organosilicon compound of Example 1.

The following table I shows a dynamic friction cofficients of the magnetic tape applied with the top coating layers according to Examples 1 to 4. The table I also shows, for the purpose of comparison dynamic friction coefficients of the top coated magnetic tape without electron beam irradiation. The value is measured by Euler's method on a drum made of aluminum.

TABLE I

| | with electron beam irradiation | | without electron beam irradiation | |
|---|---|---|---|---|
| | μd as prepared | μd after* aging | μd as prepared | μd after* aging |
| example 1 | 0.175 | 0.18 | 0.18 | 0.31 |
| 2 | 0.18 | 0.195 | 0.18 | 0.36 |
| 3 | 0.20 | 0.22 | 0.21 | 0.40 |
| 4 | 0.21 | 0.25 | 0.22 | 0.45 |

*Dynamic friction coefficient was measured on the samples kept at 60° C. for 10 days.

It is apparent from the results that according to the present invention, it is possible to obtain a magnetic recording medium having a low friction coefficient, and the friction coefficients do not change after aging.

Next, magnetic recording layer was formed on the base film as described in the above. On the magnetic layer, top coating paints shown in the following example 5 were coated in an amount of 250 mg/m². Electron beam having an energy of 300 KeV was irradiated on the layers at a dose amount of 3 Mrad.

EXAMPLE 5

Freon brand fluorcarbon solution containing 0.5 weight% acryl oligomer (molecular weight of about 2.000, having 3 acrylic groups.) and 0.5 weight% of olive oil mainly composed of ester of oleic acid and glycerine).

EXAMPLE 6

Ethylacrylate (m. w. = 100) was employed instead of the acryl oligomer of example 5.

EXAMPLE 7

Polymer having a molecular weight of about 20.000, obtained by condensation polymerization of 20 parts by weight of diacrylpentaerythritol, 30 parts by weight of 1,6-hexanediol and 50 weight parts of adipic acid, was employed instead of the acryl oligomer of example 5.

EXAMPLE 8

5.0 weight % olive oil was employed instead of 0.5 weight % in example 5.

COMPARISON

Freon solution containing 2% by weight of olive oil was coated on the magneticlayer, however, in this case there was no electron beam irradiation.

Obtained characteristics are shown in Table II.

TABLE II

| | μd | | life*[1] | Coming off amount of |
|---|---|---|---|---|
| | 1st run | 2nd run | (%) | powder (mg) |
| Example 5 | 0.085 | 0.172 | 92 | 0.6 |
| 6 | 0.183 | 0.175 | 91 | 0.7 |
| 7 | 0.173 | 0.172 | 94 | 0.5 |
| 8 | 0.170 | 0.170 | 94 | 0.3 |
| Comparison | 0.197 | 0.328 | 63 | 1.3 |

*[1]ratio of output from the magnetic tapes at 1KHZ, between the value after 100 times run on VTR and the initial value.

As apparent from the results, magnetic tapes of the present invention are superior in friction coefficient, life and coming off amount of powder.

EXAMPLE 9

A magnetic paint of the following composition was prepared

γ.Fe₂O₃: 400 weight parts
Vinylchloride-vinyleacetatevinylalcohol copolymer (VAGH made by U.C.C.): 50 weight parts
Thermoplastic polyurethane resin (Estance 5702, made by B. F. Goodrich Co.): 50 weight parts
Lecithin (dispersion agent) $CH_2=CH_2COOC_{13}H_{27}$ (lubricant): 1 weight parts
Polyisocyanate compound (Desmodur L: made by Bayer A. G.): 15 weight parts
Methylethylketone (solvent): 600 weight parts
Cyclohexanone (solvent): 600 weight parts The magnetic paint was coated on a polyethyleneterephthalate film having a thickness of 16μ to form a magnetic layer having a dry thickness of 6μ. Thus formed magnetic tape was subjected to a calender treatment. The magnetic layer was irradiated by an electron beam having an energy of 150 KeV to an amount of 5 Mrad.

EXAMPLE 10

A magnetic paint of the following composition was prepared.

γ-Fe₂O₃: 400 weight parts
Nitrocellulose (binder): 30 weight parts
Aronix M-8030 (binder): (Oligomer containing 3 acrylic group in a molecule and having a mean molecular weight of 2000. made by Toa Gosei Kagaku Co.): 20 weight parts
Estane 5702 (binder): 50 weight parts
Lecithin: 1 weight parts
$CH_2=CH-CH_2CH_2OCOC_{17}H_{35}$ (lubricant): 1 weight parts
Methylethylketone (solvent): 600 weight parts
Cyclohexanone (solvent): 600 weight parts A magnetic paint was coated similarly to Example 9, calendered and then an electron beam having an energy of 150 KeV irradiated the paint at an amount of 5 Mrad.

EXAMPLE 11

A magnetic tape was manufactured by using a lubricant of $CH_2=CHCOOCH_2CH_2C_8F_{17}$ instead of the lubricant of Example 9.

EXAMPLE 12

A magnetic tape was manufactured by using a lubricant of

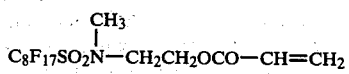

instead of the lubricant of Example 10.

Dynamic friction coefficients of the magnetic recording layers of Examples 9 to 12 were measured and the obtained results were shown in the following Table III.

TABLE III

|  | $\mu d$ as prepared | | *$\mu d$ after aging | |
|---|---|---|---|---|
|  | 1st run | 100th run | 1st run | 100th run |
| Example 9 | 0.160 | 0.195 | 0.170 | 0.220 |
| 10 | 0.158 | 0.178 | 0.165 | 0.200 |
| 11 | 0.155 | 0.169 | 0.180 | 0.210 |
| 12 | 0.190 | 0.200 | 0.230 | 0.250 |

*$\mu d$ was measured on the tape samples which were kept under a condition of 80% relative humidity at 45° C. for 1 week.

As apparent from the above results, the magnetic tapes of the present invention are low in dynamic friction coefficient and stable in aging characteristics of the friction coefficient.

EXAMPLE 13

A paint of the following composition was prepared for the non-magnetic pigment coating layer (back coating layer).
Carbon powder: 100 weight parts
ZnO powder: 20 weight parts
VAGH (binder): 25 weight parts
Estance 5702 (binder): 25 weight parts
Desmodur L (isocyanate compound): 5 weight parts
$CH_2=CHCOOC_{13}H_{27}$ (lubricant): 2 weight parts
Methylethylketone: 200 weight parts
Cyclohexanone: 200 weight parts
The above composition was mixed in a ball mill for 72 hours and passed a filter having a 5$\mu$ opening. The paint was coated on a polyethyleneterephthalate has a film having a thickness of 16$\mu$ to form a backcoating layer having a dry thickness of 2$\mu$. An electron beam having an energy of 150 KeV irradiated to the back coating layer at an amount of 5 Mrad.

EXAMPLE 14

Back coating layer was formed by using a lubricant of $CH_2=CHCOOCH_2CH_2CH_2C_8F_{17}$ instead of the lubricant of Example 13.

Dynamic friction coefficient of the back coating layers of Examples 13 and 14 were measured, and the obtained results are shown in Table IV.

TABLE IV

|  | $\mu d$ as prepared | | $\mu d$ after aging | |
|---|---|---|---|---|
|  | 1st run | 100th run | 1st run | 100th run |
| Example 13 | 0.220 | 0.280 | 0.360 | 0.370 |
| Example 14 | 0.200 | 0.250 | 0.280 | 0.380 |

As apparent from Table III, the magnetic tapes of the present invention are low in dynamic friction coefficient and superior in aging characteristics.

EXAMPLE 15

A paint of the following composition was prepared.
Butyral resion (binder): 10 weight parts
Isopropyl alcohol (solvent): 100 weight parts
$CH_2=CHCOOC_{15}H_{31}$ (lubricant): 10 weight parts
The paint was coated on a base film of polyethyleneterephthalate and dryed to form a coating layer. Then a an electron beam having an energy of 150 KeV irradiated to the coating layer at an amount of 5 Mrad.

EXAMPLE 16

A paint of the following composition was prepared.
Carbon powder: 100 weight parts
ZnO powder: 20 weight parts
VAGH: 50 weight parts
Estane 5702: 25 weight parts
Desmodur L: 5 weight parts
Methylethylketone: 200 weight parts
Cyclohexanone: 200 weight parts
The paint was coated on a polyethyleneterephthalate film to form a back coating layer having a dry thickness of 2 $\mu$m. The paint of the Example 15 was coated on the back coating layer and dryed. Then the electron beam same as in Example 15 irradiated to the layer.

EXAMPLE 17

The following paint was prepared.
$C_7H_{15}CH_2CH_2NHCH_2CH_2OCOCH=CH_2$: 1 weight parts
Freon TF (Trade name of E. I. du Pont de Nemours and Co.): 100 weight parts
The paint was coated on a back surface of the polyethyleneterephthalate base film and the electron beam irradiated it as in Example 15.

EXAMPLE 18

On the back coating layer of Example 16 the paint of Example 17 was coated and the electron beam irradiated the coating layer as in Example 16.

Dynamic friction coefficients were measured for the magnetic tapes of Examples 15 to 18 and the results are shown in Table V.

TABLE V

|  | $\mu d$ as prepared | | $\mu d$ after aging | |
|---|---|---|---|---|
|  | 1st run | 100th run | 1st run | 100th run |
| Example 11 | 0.155 | 0.170 | 0.170 | 0.220 |
| 12 | 0.220 | 0.260 | 0.270 | 0.300 |
| 13 | 0.157 | 0.160 | 0.165 | 0.180 |
| 14 | 0.200 | 0.245 | 0.250 | 0.270 |

As apparent from Table V, the magnetic tapes of the present invention are low in dynamic friction coefficient and superior in aging characteristics.

We claim as our invention:
1. In a magnetic recording medium of the type in which a magnetic recording layer composed of finely divided magnetizable pigment dispersed in a binder is formed on a major surface of a flexible, non-magnetic substrate, wherein the improvement comprises:
  a plurality of molecular chains selected from the group consisting of an aliphatic hydrocarbon group containing 7 to 21 carbon atoms and an aliphatic fluorocarbon containing 3 to 15 carbon atoms having a lubricating property are strongly bonded to a surface of the magnetic recording medium by irradiation of the molecular chains and the magnetic recording medium,
whereby free radical reactions strongly bond the lubricating molecular chains to said surface of the magnetic recording medium.

2. An improved magnetic recording medium according to claim 1, wherein said molecular chains are bonded to said magnetic recording layer.

3. An improved magnetic recording medium according to claim 1, wherein said molecular chains are bonded to a surface of said substrate opposite to said major surface.

4. An improved magnetic recording medium as described in claim 1 and further comprising:
a back coating layer formed on a surface of the non-magnetic substrate opposite to the major surface, the back coating layer comprising a non-magnetizable pigment and a binder.

5. An improved magnetic recording medium according to claim 4, wherein said molecular chains are bonded to said back coating layer.

6. An improved magnetic recording medium as described in claim 4 and further comprising:
a compound containing a double bond sensitive to dissociation products formed by irradiation admixed with the plurality of molecular chains,
wherein the plurality of molecular chains are strongly bonded to the magnetic recording medium by coating the magnetic recording medium with the admixture of the molecular chains and the double bond compound and irradiating the structure resulting therefrom.

7. An improved magnetic recording medium as described in claim 6 wherein the molecular chains and compound admixture is bonded to said back coating layer.

8. An improved magnetic recording medium as described in claim 4, wherein each molecular chain is provided with a double bond which is reactive with the dissociation products formed by the irradiation.

9. An improved magnetic recording medium as described in claim 1 and further comprising:
a compound containing a double bond sensitive to dissociation products formed by irradiation admixed with the plurality of molecular chains,
wherein the plurality of molecular chains are strongly bonded to the magnetic recording medium by coating the magnetic recording medium with the admixture of the molecular chains and the double bond compound and irradiating the structure resulting therefrom.

10. An improved magnetic recording medium as described in claim 9 or 6 wherein the molecular chains and compound admixture is bonded to said magnetic layer.

11. An improved magnetic recording medium as described in claim 9 wherein the molecular chains and compound admixture is bonded to a surface of said substrate opposite to said major surface.

12. An improved magnetic recording medium as described in claim 1, wherein each molecular chain is provided with a double bond which is reactive with the dissociation products formed by the irradiation.

13. An improved magnetic recording medium as described in claim 12 or 8, wherein said double bond is provided by an acrylic group.

14. An improved magnetic recording medium as described in claim 1, wherein the molecular chain having a lubricating property is an aliphatic hydrocarbon group containing 7 to 12 carbon atoms.

15. An improved magnetic recording medium as described in claim 1, wherein the molecular chain having a lubricating property is an aliphatic fluorocarbon containing 3 to 15 carbon atoms.

16. An improved magnetic recording medium as described in claim 1, wherein the irradiation is provided by an electron beam.

17. An improved magnetic recording medium as described in claim 1, wherein the radiation has an energy of not less than 100 KeV and at an amount of between 1 and 10 Mrad.

* * * * *